S. Andress
Motor

No. 31,522.  Patented Feb. 26, 1861.

Witnesses:
James H. Grisly
Octavius Knight

Inventor:
S. Andress
Munn & Co. Attorneys

UNITED STATES PATENT OFFICE.

SAMUEL ANDRESS, OF CHESANING, MICHIGAN.

TRANSMITTING MOTION.

Specification of Letters Patent No. 31,522, dated February 26, 1861.

*To all whom it may concern:*

Be it known that I, SAMUEL ANDRESS, of Chesaning, in the county of Saginaw and State of Michigan, have invented an Improved Device for Transmitting Motion to Machinery; and I do hereby declare that the following is a full, clear, and exact description of the same, reference being had to the accompanying drawings, making a part of this specification, in which—

Figure 1:
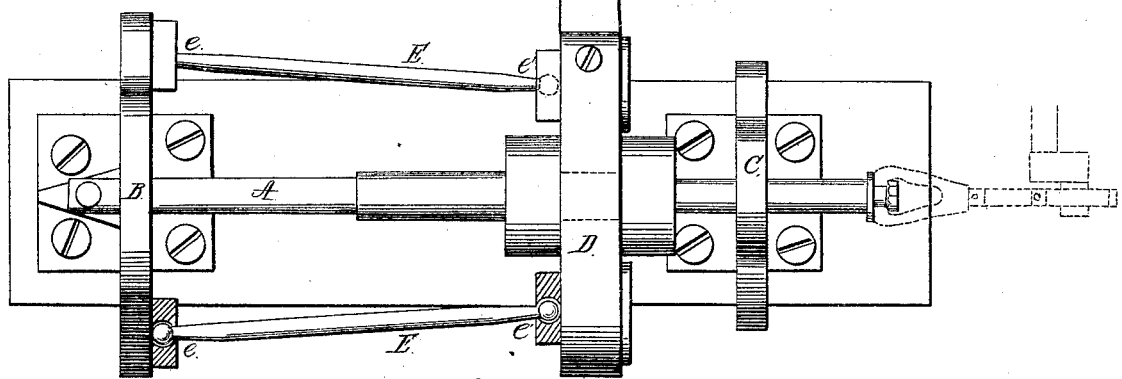
Figure 2:
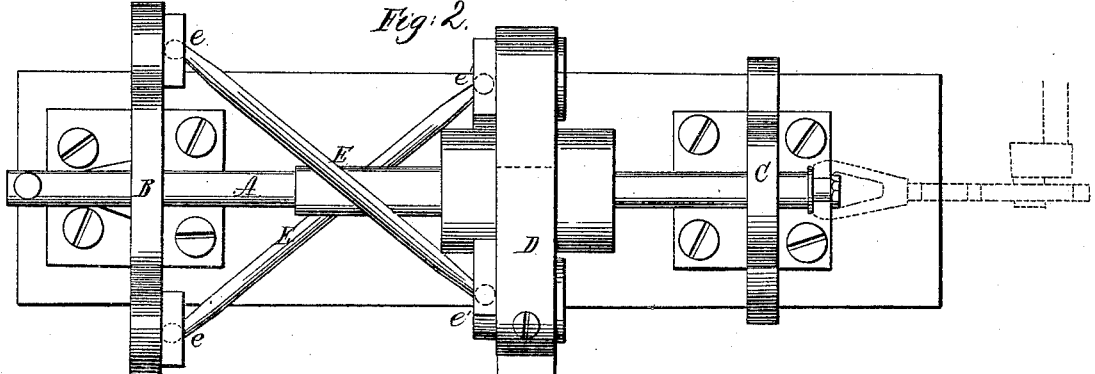

Figure 1, is a plan of the machine in its extended condition. Fig. 2, is a plan of the same as retracted.

Similar letters of reference indicate corresponding parts in both figures.

The subject of this invention is a machine adapted to transmit motion with increased power by means of standards, lever, shaft and rods, connected by universal joints so as to have a positive motion in both directions as hereinafter explained.

A, is a shaft adapted to slide endwise in the standards B, and C, by which it is supported.

D, is a lever confined between flanges *a*, so as to be capable of turning but held from endwise motion on the shaft A.

E and E', are rigid rods connected at their respective ends, by ball and socket joints *c*, *c'*, to the standard B, and lever D.

It will be evident that as the ends *e*, of the rods are secured to the fixed standard B, if the lever D, be placed in the position shown in Fig. 1, so as to bring the rods E, E', as nearly as possible to a position of parallelism with the shaft A, the latter will be extended to the right, to the end of its stroke and that by moving the lever to the position shown in Fig. 2, the shaft will be forcibly drawn back to the extremity of its stroke in the opposite direction.

If preferred the lever D, may be fixed between the flanges *a*, so as to carry the shaft A, with it in its partial rotation, the shaft being connected with the machinery to which motion is to be imparted, by a swivel joint; or on the other hand if it be preferred to hold the shaft from rotating it may for that purpose be tongued in the standards B, C, while rollers are applied to reduce the friction between the lever D, and flanges *a*.

A cross head working in fixed ways may be applied to the end of the shaft A, to preserve it from deflection by the action of the crank which it is employed to move.

I am aware that the toggle lever has been applied in a great variety of forms to multiply power and do not wish to be understood as claiming such device other than in the particular construction and connection specified.

It is an essential feature of my invention that the rods act upon the shaft equally in both directions—that is to say, with a drawing force as well as a thrust.

Having thus described my invention, what I claim as new, and desire to secure by Letters Patent; is,

The combination of the shaft A, *a*, standards B, C, oscillating lever D, and rods E, E', (working at both ends in ball and socket joints) the said parts being constructed and arranged and operating in the manner and for the purposes set forth.

SAMUEL ANDRESS.

Witnesses:
OCTAVIUS KNIGHT,
L. W. BENDRÉ.